United States Patent
Gildea et al.

[19]

[11] Patent Number: 6,018,784
[45] Date of Patent: *Jan. 25, 2000

[54] PCI CARD FOR RECEIVING A GPS SIGNAL

[75] Inventors: David R. Gildea, Menlo Park; Mark L. Nagel, Alameda, both of Calif.

[73] Assignee: Trimble Navigation Limited, Sunnyvale, Calif.

[*] Notice: This patent is subject to a terminal disclaimer.

[21] Appl. No.: 09/184,728

[22] Filed: Nov. 2, 1998

Related U.S. Application Data

[63] Continuation of application No. 08/903,965, Jul. 31, 1997, Pat. No. 5,832,247.

[51] Int. Cl.[7] .............................. G01S 5/02; H04B 7/185
[52] U.S. Cl. ........................ 710/129; 701/213; 342/57
[58] Field of Search ............................ 342/57; 701/213; 710/129

[56] References Cited

U.S. PATENT DOCUMENTS

| | | | |
|---|---|---|---|
| 4,754,465 | 6/1988 | Trimble | 375/1 |
| 5,148,452 | 9/1992 | Kennedy et al. | 375/96 |
| 5,223,844 | 6/1993 | Mansell et al. | 342/357 |
| 5,343,209 | 8/1994 | Sennott et al. | 342/357 |
| 5,345,244 | 9/1994 | Gildea et al. | 342/357 |
| 5,390,207 | 2/1995 | Fenton et al. | 375/1 |
| 5,392,052 | 2/1995 | Eberwine | 342/357 |
| 5,396,602 | 3/1995 | Amini et al. | 395/325 |
| 5,402,450 | 3/1995 | Lennen | 375/343 |
| 5,410,413 | 4/1995 | Frush et al. | 342/26 |
| 5,414,729 | 5/1995 | Fenton | 375/209 |
| 5,420,592 | 5/1995 | Johnson | 342/357 |
| 5,446,869 | 8/1995 | Padgett et al. | 395/500 |
| 5,448,703 | 9/1995 | Amini et al. | 395/290 |
| 5,448,704 | 9/1995 | Spaniol et al. | 395/310 |
| 5,450,703 | 9/1995 | Amini et al. | 395/299 |
| 5,452,216 | 9/1995 | Mounce | 364/449 |
| 5,463,553 | 10/1995 | Araki et al. | 364/444 |
| 5,497,339 | 3/1996 | Barnard | 364/705.05 |
| 5,519,403 | 5/1996 | Bickley et al. | 342/352 |
| 5,528,248 | 6/1996 | Steiner et al. | 342/357 |
| 5,606,732 | 2/1997 | Vignone, Sr. | 455/269 |

OTHER PUBLICATIONS

Altera Corporation, "PCI Compliance of Altera Devices Application Brief 140", 1995, pp. 1–9, San Jose, California.
Altera Corporation, "The Altera Advantage PCI Compliance Checklist EPM7160–10P", no date, pp. 0–4, San Jose, California.
Xilinx Inc., "Designing Flexible PCI Interfaces With Xilinx EPLDs Application Note—Version 2.0", Jan. 1995, pp. 1–21, San Jose, California.
Altera Corporation, "Ride the PCI Bus with Altera CPLDs", May 1995, ver. 2, pp. 1–2, San Jose, California.

*Primary Examiner*—Ayaz R. Sheikh
*Assistant Examiner*—Sumati Lefkowitz
*Attorney, Agent, or Firm*—David R. Gildea

[57] ABSTRACT

A peripheral component interconnect (PCI) global positioning system (GPS) card for receiving a GPS signal. In a first embodiment the PCI card includes a GPS downconverter. In a second embodiment the PCI card including the GPS downconverter is integrated into a personal computer for correlating a GPS signal and computing a GPS location. In a third embodiment the PCI card includes a GPS downconverter and a GPS correlator. In a fourth embodiment the PCI card including the GPS downconverter and the GPS correlator is integrated into a personal computer for computing a GPS location.

4 Claims, 4 Drawing Sheets

PCI CARD FOR RECEIVING A GPS SIGNAL

This application is a continuation of application Ser. No. 08/903,965, filed Jul. 31, 1997, now U.S. Pat. No. 5,832,247.

BACKGROUND OF THE INVENTION

1. Field of the Invention

The invention relates generally to peripheral component interconnect (PCI) cards for personal computers and more particularly to a PCI card for receiving a global positioning system (GPS) signal.

2. Description of the Prior Art

A personal computer (PC) is commonly used to process location, navigation, and timing data provided by a global positioning system (GPS) receiver. The GPS receiver downconverts a GPS satellite signal, correlates the downconverted signal against a replica signal, and computes GPS-derived information for location, navigation, and timing information from the correlation signal. The GPS-derived data is then issued to the PC using a convenient data signal interface format such as RS232, RS422, PC104, or PCMCIA. The PC processes and displays the GPS-derived data in a form that is useful for an application.

Existing GPS receivers include one or more memory chips for storing correlation and computation firmware and a microprocessor for executing the firmware to correlate the GPS signal and compute the GPS-derived data. Such GPS receivers are conceptually straightforward because they are self-contained and the communication with the PC is simple and well-defined. However, the use of the memory chips and microprocessor in the GPS receiver is wasteful because the PC must include memory and processing power in any case. Further, due to the recent advances in custom GPS chipsets, the cost of the memory chips and microprocessor in the GPS receiver are a major portion of the cost of an entire GPS receiver. Unfortunately, little or no effort has been made to use the memory and processing power in the PC to reduce or eliminate the cost of memory chips and/or microprocessor in the GPS receiver because of the conceptual complexity of such GPS receiver and because the convenient data signal interface formats are too slow to pass the downconverted signal and/or the correlation signal between the GPS receiver and the PC.

Recently, a peripheral component interconnect (PCI) bus has been used to interface high speed signals between the PC and an embedded PCI card for full-motion video editing and serving. The PCI bus provides a data path capable of accessing up to 264 megabytes of data per second. In addition to being optimized for high bandwidth, the PCI bus also addresses cache coherency, multiple bus master support, and processor independence. Commercial PCI bus bridges are now available for interfacing to the PCI bus.

SUMMARY OF THE INVENTION

It is therefore an object of the present invention to provide a peripheral component interconnect (PCI) global positioning system (GPS) downconverter card for receiving a GPS signal and issuing a downconverted GPS signal according to a PCI bus format.

Another object is to integrate a PCI GPS downconverter card for downconverting a GPS signal with a host personal computer (PC) for correlating the downconverted GPS signal and computing GPS-derived information for location, navigation, or timing.

Another object is to provide a PCI GPS correlator card for receiving a GPS signal and issuing a GPS correlation signal according to a PCI bus format.

Another object is to integrate a PCI GPS correlator card for downconverting and correlating a GPS signal to a host PC for computing GPS-derived information for location, navigation, or timing.

Briefly, in a first embodiment of the present invention a PCI GPS downconverter card includes a GPS downconverter and a PCI bus bridge. In a second embodiment of the present invention a GPS receiver includes the PCI GPS downconverter card and a host PC including a host PCI bus bridge and an executable code including a correlation program and a location, navigation, and timing (LNT) program. In a third embodiment of the present invention a PCI GPS correlator includes a GPS downconverter, a GPS correlator, and a PCI bus bridge. In a fourth embodiment of the present invention a GPS receiver includes the PCI GPS correlator card and a host PC including a host PCI bus bridge and an executable code including an LNT program.

An advantage of the present invention is that the PCI GPS downconverter card issues a downconverted GPS signal in a PCI bus format allowing for further processing in a host PC.

Another advantage is that the GPS receiver uses a microprocessor and memory in a host PC for correlating a downconverted GPS signal and computing GPS-derived information, thereby reducing the cost of the GPS receiver.

Another advantage is that the PCI GPS correlator card issues a GPS correlation signal in a PCI bus format allowing for further processing in a host PC.

Another advantage is that the GPS receiver uses a microprocessor and memory in a host PC for computing GPS-derived information, thereby reducing the cost of the GPS receiver.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
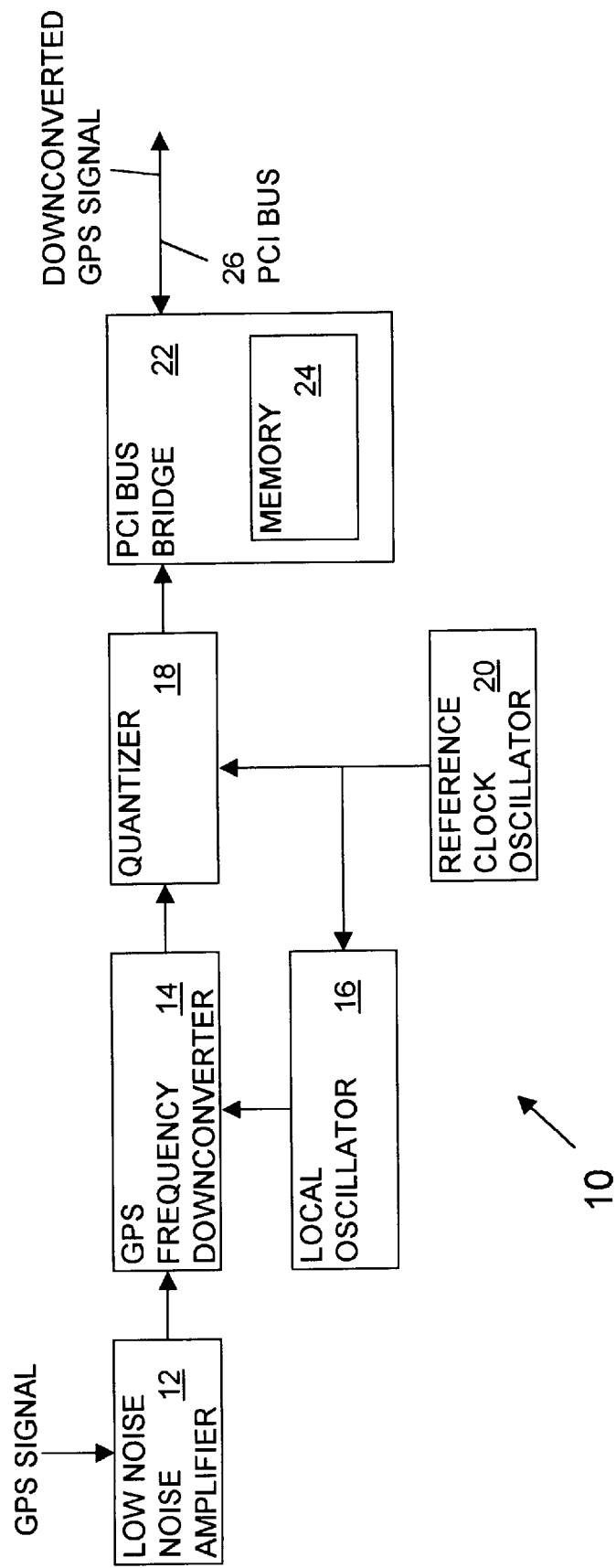
FIG. 1 is a block diagram of a personal component interconnect (PCI) global positioning system (GPS) downconverter card of the present invention.

FIG. 1 illustrates a personal component interconnect (PCI) global positioning system (GPS) downconverter card of the present invention and referred to by the general reference number 10. The PCI GPS downconverter card 10 preferably includes a low noise amplifier 12 for receiving a conducted electrical GPS signal including GPS location determination data from a GPS antenna. The low noise amplifier 12 passes an amplified GPS signal to a GPS frequency downconverter 14. The GPS frequency downconverter 14 uses a local oscillator signal from a local oscillator 16 to downconvert the frequency of the GPS signal and issues a downconverted GPS signal. A quantizer 18 samples the downconverted GPS signal at a rising or falling edge of a reference clock signal from a reference clock oscillator 20 and issues a bit stream for the downconverted signal including an I bit stream representing two or more levels of inphase modulation in the GPS signal and a Q bit stream representing two or more levels of quadrature phase modulation in the GPS signal. Preferably, the local oscillator 16 includes a phase lock loop to lock the local oscillator signal to the reference clock signal. A PCI bus bridge 22 caches the I and Q bits in a memory 24 and passes the bits, representative of the GPS location determination data, to a PCI bus 26 when authorized over the PCI bus 26 to do so.

Several U.S. Patents teach apparatus and methods for downconverting and correlating the GPS signal. U.S. Pat. No. 4,754,465 for a "Global Positioning System Course Acquisition Code Receiver" by Trimble, incorporated herein by reference, discloses a representative example of a GPS downconverter. U.S. Pat. No. 5,390,207 by Fenton et al. for a "Pseudorandom Noise Ranging Receiver Which Compensates for Multipath Distortion by Dynamically Adjusting the Time Delay Spacing between Early and Late Correlators", U.S. Pat. No. 5,402,450 by Lennon for a "Signal Timing Synchronizer", and U.S. Pat. No. 5,414,729 by Fenton for a "Pseudorandom Noise Ranging Receiver Which Compensates for Multipath Distortion by Making Use of Multiple Correlator Time Delay Spacing", incorporated herein by reference, teach various apparatus and methods for correlating to the GPS signal.

Figure 2:
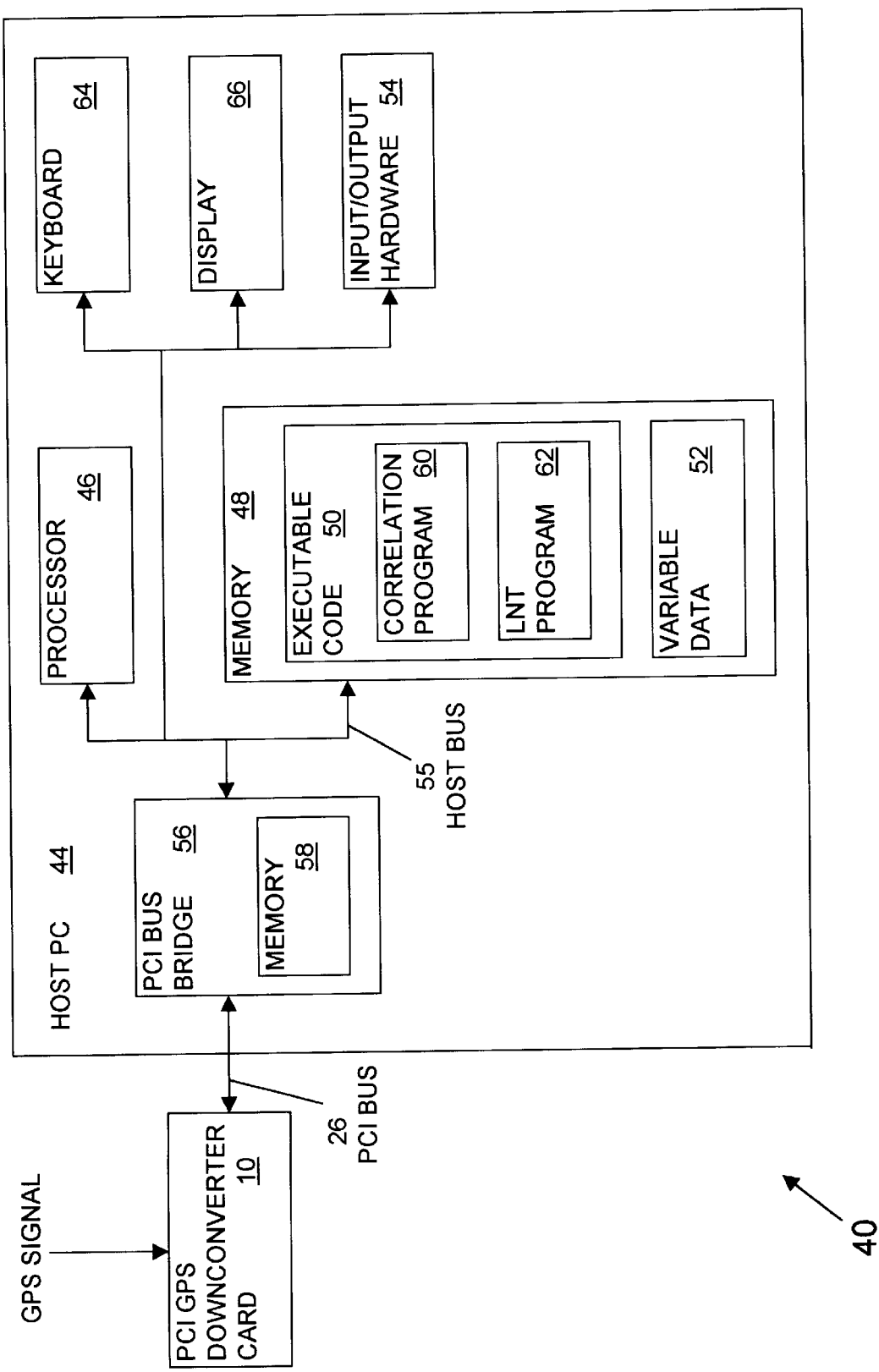
FIG. 2 is a block diagram of the present invention of a GPS receiver including the PCI GPS downconverter card of FIG. 1 integrated into a personal computer (PC)

FIG. 2 illustrates a global positioning system (GPS) receiver of the present invention and referred to by the general reference number 40 and including the PCI GPS downconverter card 10 of the FIG. 1 coupled to the PCI bus 26. The GPS receiver 40 includes a host personal computer (PC) 44 including a processor 46 including various associated hardware, a memory 48 including an executable code 50 and variable data 52, and input/output hardware 54 operating on a host bus 55 in a conventional manner. The input/output hardware 54 includes circuitry for communicating to external equipment over serial and/or parallel interfaces. Typically, the memory 48 includes one or more read only memory chips for storing a BIOS program, a dynamic ram for storing variable data 52 including cache data, a hard disk drive and hard disk, and one or more soft disk drives where soft disk memories may be inserted. The host PC 44 further includes a PCI bus bridge 56, including a memory 58, for converting between PC-formatted signals on the PCI bus 26 and host bus signals on the host bus 55. The executable code 50 includes code for authorizing the card PCI bus bridge 22 (FIG. 1) and receiving the bits for the downconverted GPS signal from the PCI bus 26 through the PCI bus bridge 56. The executable code 50 further includes a correlation program 60 for providing a GPS replica and correlating the downconverted GPS signal to the GPS replica to provide correlation data. A location, navigation, or timing (LNT) program 62, included in the executable code 50, operates on the correlation data to compute GPS-derived location, navigation, or timing information. A keyboard 64 receives requests from a user for operating the PC 44. A display 66 displays information including the GPS-derived location to the user in a visually perceptible form.

Figure 3:
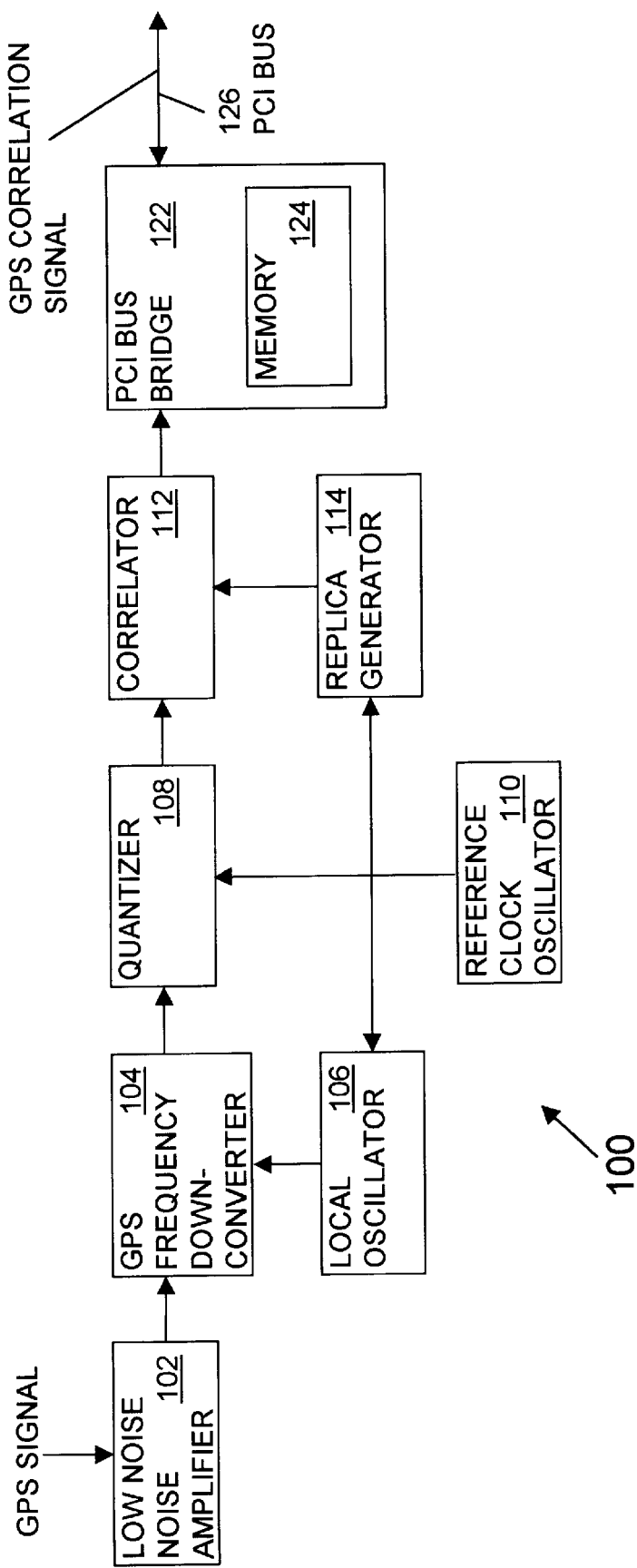
FIG. 3 is a block diagram of a PCI GPS correlator card of the present invention.

FIG. 3 illustrates a personal component interconnect (PCI) global positioning system (GPS) correlator card of the present invention and referred to by the general reference number 100. The PCI GPS correlator card 100 preferably includes a low noise amplifier 102 for receiving a conducted electrical GPS signal including location determination data from a GPS antenna. The low noise amplifier 102 passes an amplified GPS signal to a GPS frequency downconverter 104. The GPS frequency downconverter 104 uses a local oscillator signal from a local oscillator 106 to downconvert the frequency of the GPS signal and issues a downconverted GPS signal. A quantizer 108 samples the downconverted GPS signal at a rising or falling edge of a reference clock signal from a reference clock oscillator 110 and issues a quantized GPS signal to at least one correlator 112. Preferably, the local oscillator 106 includes a phase lock loop to lock the local oscillator signal to the reference clock signal. The correlator 112 receives a GPS replica signal from a replica generator 114 and provides a correlator output signal including correlation data to a PCI bus bridge 122 for a correlation of the quantized GPS signal and the GPS replica signal. The replica generator 114 uses the reference clock signal and receives adjustment data for adjusting a PRN code, a rate, and a timing to acquire and track the GPS signal. Preferably, the correlation data is organized into at least two 1023 bit words corresponding to the correlation data of 1023 bits in each of the I channel and Q channel of the GPS signal with the 1023 bits in each of the I and Q channels of the replica signal. The PCI bus bridge 122 caches the bits in a memory 124 and passes the words, representative of the GPS location determination data, to a PCI bus 126 when authorized over the PCI bus 126 to do so. The PCI bus 126 issues a feedback adjustment signal including the adjustment data to the PCI bus bridge 122. The PCI bus bridge 122 passes the adjustment data to the replica generator 114.

Figure 4:
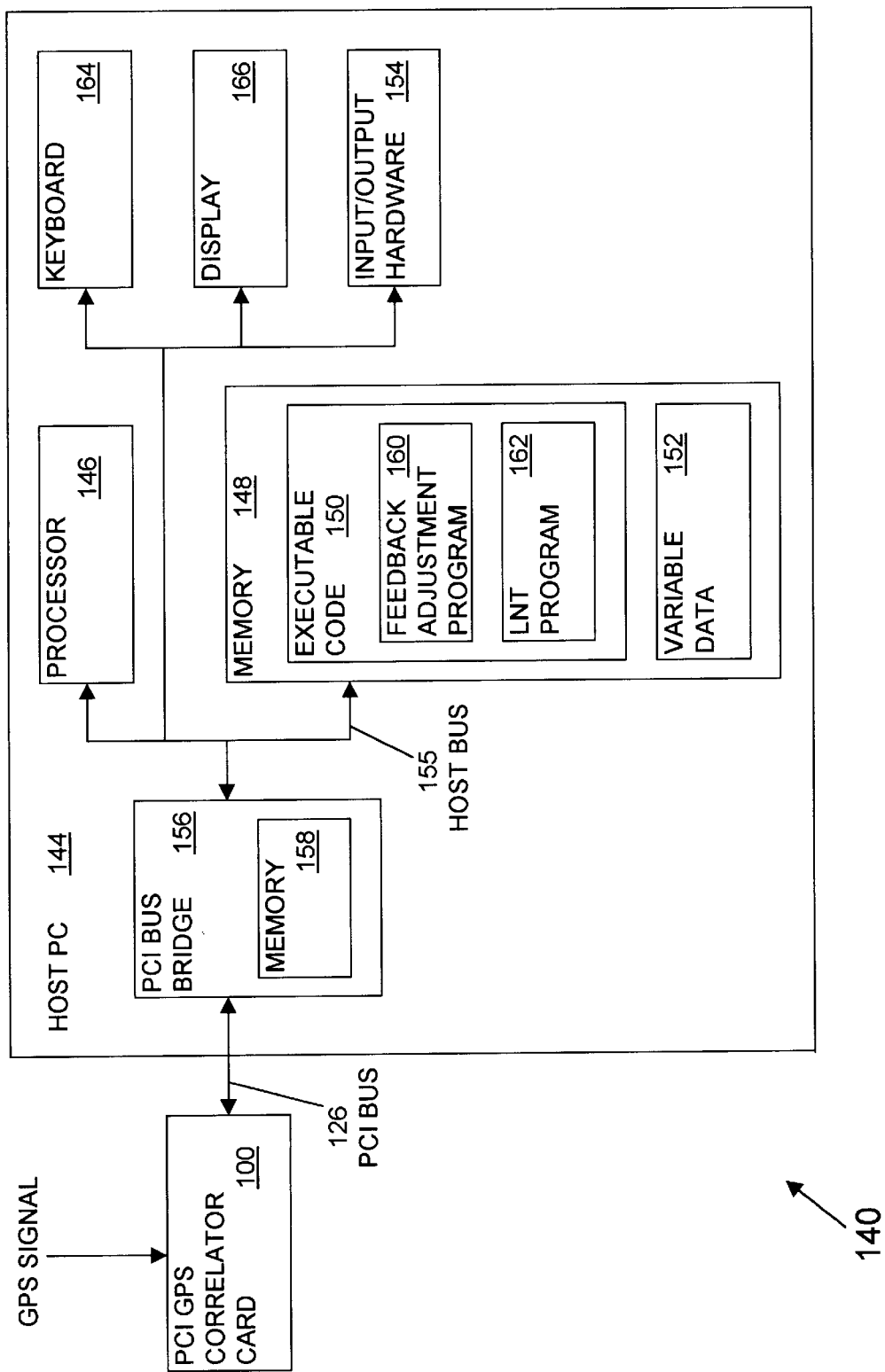
FIG. 4 is a block diagram of the present invention of a GPS receiver including the PCI GPS correlator card of FIG. 3 integrated into a personal computer (PC).

FIG. 4 illustrates a global positioning system (GPS) receiver of the present invention and referred to by the general reference number 140 including the PCI GPS correlator card 100 coupled to the PCI bus 126. The GPS receiver 140 includes a host personal computer (PC) 144 including a processor 146 including associated hardware, a memory 148 including an executable code 150 and variable data 152, and input/output hardware 154 operating on a host bus 155 in a conventional manner. The input/output hardware 154 includes circuitry for communicating to external equipment over serial and/or parallel interfaces. Typically, the memory 148 includes one or more read only memory chips for storing a BIOS program, a dynamic ram for storing variable data 152 including cache memory, a hard disk drive and hard disk, and one or more soft disk drives where soft disk memories may be inserted. The host PC 144 further includes a PCI bus bridge 156, including a memory 158, for converting between PCI-formatted signals on the PCI bus 126 and host bus signals on the host bus 155. The executable code 150 includes code for authorizing the card PCI bus bridge 122 (FIG. 3) to pass the words for the correlation data across the PCI bus 126 through the PCI bus bridge 156. The executable code 150 further includes a feedback adjustment program 160 for providing adjustment data for changing the rate, the timing, and the PRN code to cause the GPS replica signal generating by the replica generator 114 (FIG. 3) to acquire and to track the GPS signal. The executable code 150 further includes a location, navigation, or timing (LNT) code 162 for operating on the correlation data to compute GPS-derived location, navigation, or timing information. Because the correlator output signal has a lower baud rate than the downconverted GPS signal, the processor 146 can operate at a lower instruction rate or allocate of smaller percentage of time for processing GPS than the processor 46

(FIG. 2). A keyboard 164 receives requests from a user for operating the PC 144. A display 166 displays information including the GPS-derived location to the user in a visually perceptible form.

The characteristics and operation of the PCI bus 26 (FIG. 2) and 126 (FIG. 4) are described in "PCI Hardware and Software Architecture and Design" pages 1 to 749, by Edward Solari and George Willse published by Annabooks of San Diego, Calif., ISBN 0-929392-28-0, second edition in 1994 and 1995. Several commercially available parts are available for use as the PCI bus bridge 22 (FIG. 1), 56 (FIG. 2), 122 (FIG. 3), and 126 (FIG. 4) including a Xilinx model XC7300 EPLD described in "Designing Flexible PCI Interfaces With Xilinx EPLDs" available from Xilinx, Inc., San Diego, Calif., under a part no. 0010216-02; an AMCC series S5930-S5933 described in "AMCC S5930-S5933 PCI Controllers, PCI Local Bus, Matchmaker PCI Controllers" available from Applied Micro Circuits Corporation of San Diego, Calif. and Altera MAX7000, FLEX8000, FLEX9000, and FLASHlogic model series'described in "PCI Compliance of Altera Devices, Application Brief 140, May 1995, ver. 2", "Ride the PCI Bus with Altera CPLDs" published in 1995, and "PCI Compliance Checklist EPM7160E-10P" available from Altera Corporation, San Jose, Calif.

Methods and apparatus for operating according to the PCI format are included in U.S. Pat. No. 5,396,602 for "Arbitration Logic for Multiple Bus Computer System" by Amini et al., U.S. Pat. No. 5,446,869 for "Configuration and RAM/ROM Control of PCI Extension Card Residing on MCA Adapter Card" by Padgett et al., U.S. Pat. No. 5,448,703 for "Method and Apparatus for Providing Back-to-Back Data Transfers in an Information Handling System Having a Multiplexed Bus" by Amini et al., U.S. Pat. No. 5,448,704 for "Method for Performing Writes of Non-Contiguous Bytes on a PCI Bus in a Minimum Number of Write Cycles" by Spaniol et al., and U.S. Pat. No. 5,450,551 "System Direct Memory Access (DMA) Support Logic for PCI Based Computer System" by Amini et al., the teachings of which are incorporated herein by reference.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for receiving a Global Positioning System (GPS) signal having GPS location-determination data, comprising:

receiving said GPS signal at a high frequency;

downconverting and quantizing said GPS signal for providing a lower frequency GPS signal;

formatting said lower frequency GPS signal as a peripheral component interconnect (PCI)-formatted signal having said GPS location-determination data; and issuing said PCI-formatted signal.

2. The step of claim 1, further including steps of:

receiving said PCI-formatted signal in a computing device;

de-formatting said PCI-formatted signal for providing a computing device signal having said GPS location-determination data; and determining a GPS-based location from said computing device signal.

3. A Global Positioning System (GPS) receiver for receiving a GPS signal including GPS location-determination data, comprising:

a GPS downconverter including a quantizer for receiving said GPS signal at a high frequency and issuing a quantized GPS signal at a lower frequency; and a peripheral component interconnect (PCT) bus bridge coupled to the GPS downconverter for receiving said lower frequency GPS signal, for formatting said lower frequency GPS signal according to a PCI bus format, and for issuing a PCI-formatted signal including said GPS location-determination data.

4. The GPS receiver of claim 3, further comprising:

a PCI bus for receiving said PCI-formatted signal;

a second PCI bus bridge de-formatting said PCI-formatted signal for providing a computing device signal having said GPS location-determination data; and a processor for determining a GPS-based location from said computing device signal.

* * * * *